United States Patent
Kurkowski et al.

(10) Patent No.: US 12,010,365 B2
(45) Date of Patent: Jun. 11, 2024

(54) METHODS AND SYSTEMS FOR CONTENT MANAGEMENT

(71) Applicant: Comcast Cable Communications, LLC, Philadelphia, PA (US)

(72) Inventors: Stuart Kurkowski, Denver, CO (US); Gregg Brown, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/710,363

(22) Filed: Mar. 31, 2022

(65) Prior Publication Data
US 2023/0319330 A1    Oct. 5, 2023

(51) Int. Cl.
*H04N 21/254* (2011.01)
*H04N 21/258* (2011.01)
*H04N 21/266* (2011.01)
*H04N 21/6543* (2011.01)

(52) U.S. Cl.
CPC ... *H04N 21/2541* (2013.01); *H04N 21/25816* (2013.01); *H04N 21/266* (2013.01); *H04N 21/6543* (2013.01)

(58) Field of Classification Search
CPC ......... H04N 21/2541; H04N 21/25816; H04N 21/266; H04N 21/6543
See application file for complete search history.

(56) References Cited

U.S. PATENT DOCUMENTS

| | | | | |
|---|---|---|---|---|
| 6,904,609 | B1* | 6/2005 | Pietraszak | H04N 21/47 725/39 |
| 7,076,202 | B1* | 7/2006 | Billmaier | H04N 21/4334 455/66.1 |
| 7,370,342 | B2* | 5/2008 | Ismail | H04N 21/252 348/E5.002 |
| 7,433,873 | B2* | 10/2008 | Kang | H04N 21/8543 |
| 7,484,233 | B2* | 1/2009 | Pietraszak | H04N 21/84 725/39 |
| 7,603,687 | B2* | 10/2009 | Pietraszak | H04N 21/4782 725/50 |
| 8,051,454 | B2* | 11/2011 | Krikorian | H04L 65/611 725/95 |
| 8,255,531 | B2* | 8/2012 | Bose | G06F 3/1462 709/227 |
| 8,280,949 | B2* | 10/2012 | Bergquist | H04N 21/8586 709/248 |
| 8,302,127 | B2* | 10/2012 | Klarfeld | H04N 21/4751 705/14.66 |
| 8,458,613 | B2* | 6/2013 | Oshiro | G06F 3/04842 715/810 |
| 8,495,679 | B2* | 7/2013 | Labeeb | H04N 21/26283 725/40 |
| 8,612,598 | B1* | 12/2013 | Chaudhry | H04N 21/2665 709/212 |

(Continued)

*Primary Examiner* — Michael B. Pierorazio
(74) *Attorney, Agent, or Firm* — Ballard Spahr LLP (57) ABSTRACT

Methods and systems for content management are described. If programming content is distributed to viewers, markers are transmitted with the programming content. If a user device receives the marker, the user device may send an output indication to a rights management device. The rights management device may determine whether or not the user device outputting the content violates or adheres to a content policy and may take an action based on that determination.

20 Claims, 6 Drawing Sheets

(56) References Cited

U.S. PATENT DOCUMENTS

| | | | |
|---|---|---|---|
| 9,838,728 B2* | 12/2017 | Kannan | H04N 21/4532 |
| 10,154,298 B2* | 12/2018 | Kannan | H04N 21/25891 |
| 2003/0046689 A1* | 3/2003 | Gaos | H04N 21/42203 |
| | | | 715/745 |
| 2003/0067554 A1* | 4/2003 | Klarfeld | G11B 27/322 |
| | | | 725/135 |
| 2003/0093792 A1* | 5/2003 | Labeeb | H04N 7/163 |
| | | | 725/38 |
| 2004/0123319 A1* | 6/2004 | Kim | H04N 7/165 |
| | | | 348/E7.063 |
| 2004/0139480 A1* | 7/2004 | Delpuch | H04N 7/17318 |
| | | | 348/E7.071 |
| 2005/0097605 A1* | 5/2005 | Itou | H04N 7/17336 |
| | | | 725/39 |
| 2005/0177849 A1* | 8/2005 | Pietraszak | H04N 21/4431 |
| | | | 725/39 |
| 2005/0183116 A1* | 8/2005 | Pietraszak | H04N 21/26283 |
| | | | 725/39 |
| 2006/0047668 A1* | 3/2006 | Kang | H04N 21/8543 |
| 2006/0206912 A1* | 9/2006 | Klarfeld | H04N 21/4823 |
| | | | 725/39 |
| 2006/0212900 A1* | 9/2006 | Ismail | H04N 21/44224 |
| | | | 725/35 |
| 2006/0212904 A1* | 9/2006 | Klarfeld | H04N 21/6587 |
| | | | 725/45 |
| 2007/0112826 A1* | 5/2007 | Laksono | G11B 20/00007 |
| | | | 707/999.102 |
| 2008/0114880 A1* | 5/2008 | Jogand-Coulomb | H04L 61/30 |
| | | | 709/227 |
| 2009/0106391 A1* | 4/2009 | Wang | H04L 12/1895 |
| | | | 709/217 |
| 2009/0133074 A1* | 5/2009 | White | H04N 7/165 |
| | | | 725/50 |
| 2009/0248700 A1* | 10/2009 | Amano | G06F 16/313 |
| 2009/0260038 A1* | 10/2009 | Acton | H04N 21/482 |
| | | | 725/49 |
| 2010/0162305 A1* | 6/2010 | Downey | H04N 21/47 |
| | | | 725/39 |
| 2010/0191860 A1* | 7/2010 | Krikorian | H04N 21/4384 |
| | | | 709/231 |
| 2010/0205636 A1* | 8/2010 | Coburn | H04N 21/44224 |
| | | | 725/46 |
| 2010/0223407 A1* | 9/2010 | Dong | H04N 21/2402 |
| | | | 710/70 |
| 2010/0287588 A1* | 11/2010 | Cox | H04N 21/252 |
| | | | 725/40 |
| 2010/0299264 A1* | 11/2010 | Berger | G06Q 30/0601 |
| | | | 705/59 |
| 2011/0116540 A1* | 5/2011 | O'Connor | H04N 21/47 |
| | | | 725/54 |
| 2011/0126232 A1* | 5/2011 | Lee | H04N 21/6405 |
| | | | 707/E17.049 |
| 2011/0161622 A1* | 6/2011 | Maeda | G06F 12/1027 |
| | | | 711/207 |
| 2011/0185387 A1* | 7/2011 | Schein | H04N 7/165 |
| | | | 725/46 |
| 2012/0023529 A1* | 1/2012 | Azam | H04N 21/2221 |
| | | | 725/93 |
| 2015/0189353 A1* | 7/2015 | Kannan | H04N 21/482 |
| | | | 725/54 |
| 2018/0077441 A1* | 3/2018 | Kannan | H04N 21/84 |
| 2020/0412786 A1* | 12/2020 | Loheide | H04L 65/611 |

* cited by examiner

410 — RECEIVE CONTENT AND A MARKER

420 — CAUSE CONTENT TO BE OUTPUT

430 — SEND AN OUTPUT INDICATION

440 — RECEIVE A POLICY VIOLATION INDICATION

450 — CAUSE TERMINATION OF CONTENT OUTPUT

METHODS AND SYSTEMS FOR CONTENT MANAGEMENT

BACKGROUND

Human and network errors can cause operators and content providers to incorrectly apply a content blackout. If the wrong content is shown to the wrong audience, or if content that should be available to an audience is not made available to the audience, content providers may be liable for violating the terms of an agreement. Further, auditing the application of a content blackout is difficult due to the large number of individual devices receiving content.

SUMMARY

It is to be understood that both the following general description and the following detailed description are exemplary and explanatory only and are not restrictive. Methods and systems for content management are described. Content and a marker may be sent to a device and based on receiving the marker, the device may send an output notification indicating that the device received and output the content. The device may be associated with an identifier and, based on the identifier, it may be determined whether or not the device should have output the content.

BRIEF DESCRIPTION OF THE DRAWINGS

The accompanying drawings, which are incorporated in and constitute a part of this specification, show examples and together with the description, serve to explain the principles.

DETAILED DESCRIPTION

As used in the specification and the appended claims, the singular forms "a," "an," and "the" include plural referents unless the context clearly dictates otherwise. Ranges may be expressed herein as from "about" one particular value, and/or to "about" another particular value. If such a range is expressed, another configuration includes from the one particular value and/or to the other particular value. Similarly, if values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is to be understood that if combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information." Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic advertisement insertion data (.csv), Adobe® Photoshop® (.PSD) format or some other format for electronically storing text, graphics and/or other information whether such format is presently known or developed in the future. Content items may be any combination of the above-described formats.

This detailed description may refer to a given entity performing some action. It should be understood that this language may in some cases mean that a system (e.g., a computer) owned and/or controlled by the given entity is actually performing the action.

Figure 1A:
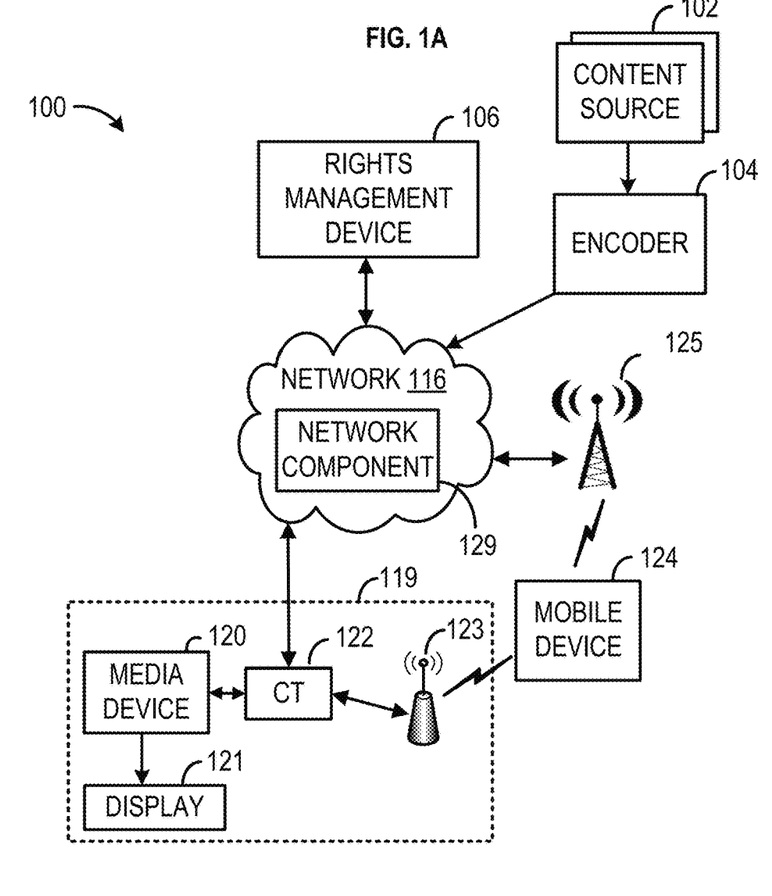
FIGS. 1A-1B show an example system for content management.

FIG. 1 shows a system 100 for content distribution. Those skilled in the art will appreciate that digital equipment and/or analog equipment may be employed. Those skilled in the art will appreciate that provided herein is a functional description and that the respective functions may be performed by software, hardware, or a combination of software and hardware.

The system 100 may comprise a content source 102, an encoder 104, a rights management device 106, and/or a media device 120. Each of the content source 102, the encoder 104, the rights management device 106, and/or the media device 120 can be one or more computing devices, and some or all of the functions performed by these components may at times be performed by a single computing device. The content source 102, the encoder 104, the rights management device 106, and/or the media device 120 may be configured to communicate through a network 116. The network 116 may facilitate sending content from the content source 102 to the media device 120 (or other device) at a user location 119. The network 116 may facilitate sending advertisements from the rights management device 106 to the media device 120 (or other device) at the user location 119. The network 116 may be a content delivery network, a content access network, combinations thereof, and the like. The network may be managed (e.g., deployed, serviced) by a content provider, a service provider, combinations thereof, and the like. The network 116 may be an optical fiber network, a coaxial cable network, a hybrid fiber-coaxial network, a wireless network, a satellite system, a direct broadcast system, or any combination thereof. The network 116 can be the Internet. The network 116 may have a network component 129. The network component 129 may be any device, module, combinations thereof, and the like communicatively coupled to the network 116. The network component 129 may be a router, a switch, a splitter, a packager, a gateway, an encoder, a storage device, a multiplexer, a network access location (e.g., tap), physical link, combinations thereof, and the like.

The content source 102 may be configured to send content (e.g., video, audio, movies, television, games, applications, data, etc.) to one or more devices such as the encoder 104, a network component 129, a first access point 123, a mobile device 124, a second access point 125, and/or the media device 120. The content source 102 may be configured to send streaming media, such as broadcast content, video on-demand content (e.g., VOD), content recordings, combinations thereof, and the like. The content source 102 may be managed by third party content providers, service providers, online content providers, over-the-top content providers, combinations thereof, and the like. The content may be sent based on a subscription, individual item purchase or rental, combinations thereof, and the like. The content source 102 may be configured to send the content via a packet switched network path, such as via an IP based connection. The content may comprise a single content item, a portion of a content item (e.g., content fragment), a content stream, a multiplex that includes several content items, combinations thereof, and the like. The content may be accessed by users via applications, such as mobile applications, television applications, STB applications, gaming device applications, combinations thereof, and the like. An application may be a custom application (e.g., by content provider, for a specific device), a general content browser (e.g., web browser), an electronic program guide, combinations thereof, and the like. The content may comprise signaling data.

The encoder 104 may receive the content. One or more markers data may be inserted by the encoder 104 in a Moving Picture Experts Group (MPEG) bitstream, MPEG Supplemental Enhancement Information (SEI) messages, MPEG-2 Transport Stream (TS) packet, MPEG-2 Packetized Elementary Stream (PES) header data, ISO Base Media File Format (BMFF) data, ISO BMFF box, or any in any data packet. For example, the one or more markers may comprise Society of Cable and Television Engineers 35 (SCTE-35) markers and/or Society of Cable and Television Engineers 224 (SCTE-224) markers. The Society of Cable Telecommunications Engineers 35 (SCTE35) and Society of Cable and Television Engineers 224 (SCTE_224) are hereby incorporated by reference in its entirety. The Society of Cable Telecommunications Engineers 30 (SCTE30) and the Society of Cable Telecommunications Engineers 130 (SCTE130) are also hereby incorporated by reference in their entirety. The encoder 104 may determine (e.g., generate), based on the marker, a unique marker identifier (marker ID). The encoder 104 may generate the marker ID based on the time at which the encoder 104 determined the marker. The encoder 104 may generate the marker ID based on any parameter associated with the content, for example, a destination of the content. The encoder 104 may send, to the media device 120, the marker ID. For example, the encoder 104 may determine an XML namespace prefix identifying the marker as an SCTE-35 marker. For example, the encoder 104 may identify a cue_identifier_descriptor and/or a cue_stream_type value associated with the marker such as "splice_insert" "splice_null," "splice_schedule" combinations thereof, and the like.

The marker ID may be sent to the media device 120 along with the content (e.g., from the content source 102). The marker ID may be sent to the media device 120 separate from the content. The marker ID may be sent to the media device 120 in a data packet. For example, the marker ID may be inserted, by the encoder 104, into the SCTE-35 marker. The marker ID may be sent to the media device 120 at the same time as the content. The marker ID may arrive at the media device 120 at approximately the same time as the marker in the content arrives at the media deice 120.

The media device 120 may receive the content and the one or more markers. The media device 120 may comprise a user device such as an STB, computer, mobile phone, combinations thereof, and the like. The media device 120 may be a digital streaming device, a gaming device, a media storage device, a digital recording device, a computing device, a mobile computing device (e.g., a laptop, a smartphone, a tablet, etc.), combinations thereof, and the like. The media device 120 may determine the marker in the content. For example, the media device 120 may determine the XML namespace prefix identifying the marker as an SCTE-35 marker. For example, the media device 120 may identify a cue_identifier_descriptor and/or a cue_stream_type value associated with the marker such as "splice_insert" "splice_null," "splice_schedule" combinations thereof, and the like. A person skilled in the art will appreciate that the aforementioned examples are non-limiting. The media device 120 may process the one or more markers to determine the one or more beacons.

The one or more markers may be configured to cause one or more user devices (e.g., the media device 120) that receive the one or more markers to send one or more output indications and/or one or more feature queries. For example, the one or more markers may comprise one or more beacons configured to cause the one or more user devices (e.g., the media device 120) to issue a beacon call. The one or more beacons may comprise one or more files embedded in the one or more markers. The beacon call may comprise information about the content, a location associated with the media device, an output indication, one or more feature queries, an impression count, combinations thereof, and the like. The one or more output indications may comprise one or more content identifiers (e.g., a title, a channel, a content identifier, combinations thereof, and the like). The one or more output indications may comprise timing data (e.g., a time at which the one or more markers were received, a time at which the content was received, a time at which the content was output, a time at which the content was requested by the media device 120, combinations thereof, and the like). The one or more content output indications may comprise location information (e.g., a location of the media device 120 such as latitude and longitude, a geographic region, a syscode, a jurisdiction, combinations thereof, and the like). The one or more output indications may comprise one or more user device identifiers. The one or more user device identifiers may be associated with the one or more user devices (e.g., the media device 120). For example, the one or more user device identifiers may comprise, for example, a unique string or characters, letters, numbers, symbols, etc. For example, the device identifier may comprise an OUI, a MAC address, an IP address, model number, a brand name, or any other identifier.

Based on receiving the marker, the media device 120 may send a content output indication to the rights management device 106. The content output indication may comprise at least one of the marker ID, the marker timestamp, a media device ID, and/or a content ID, the location information, the timing data, and/or the one or more user device identifiers. The media device ID may comprise a unique identifier associated with the media device 120. For example, the media device ID may comprise a MAC address. The MAC address may be associated with a geographic ID (e.g., a "syscode"). The syscode may comprise a four digit code determined by National Cable Communications (NCC) to represent a specific geography available for advertisement insertion. The syscode may represent a specific geographic zone, grouping of zones, a cable interconnect or grouping of cable interconnects, combinations thereof, and the like. The content ID may comprise a unique ID associated with the content. For example, the content ID may comprise at least one of a channel ID, a frequency ID, a content title, a television network name, combinations thereof, and the like.

Figure 1B:
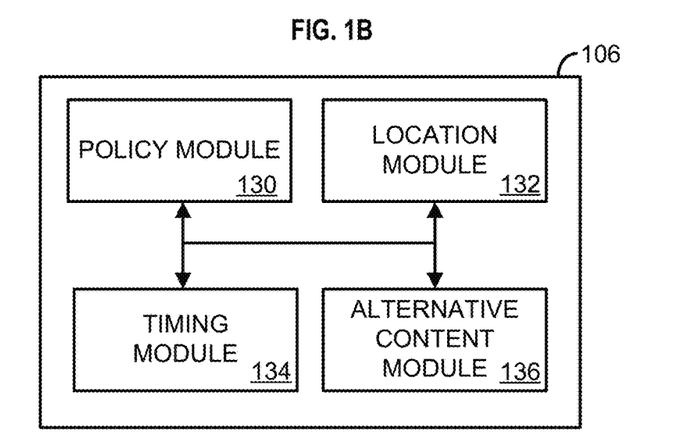

The rights management device 106 may receive the one or more content output indications. The rights management device 106 may comprise one or more computing devices (e.g., servers) configured to store, cause storage, determine, cause determination, send, and/or cause sending data. As shown in FIG. 1B, the rights management device 106 may comprise a policy module 130, a location module 132, a timing module 134, and alternative content module 136.

The rights management device 106 may receive the one or more content output indications from the media device 120. The rights management device 106 may receive a plurality of one or more content output indications. The rights management device 106 may receive the plurality of advertisements requests from a plurality of media devices. Each one or more content output indication of the plurality of one or more content output indications may comprise one or more content output indication timestamps. The one or more content output indication timestamps may indicate when a given user device (e.g., the media device 120) of the one or more user devices sent the one or more content output indications. If the rights management device 106 receives the plurality of one or more content output indications, for each one or more content output indications of the plurality of one or more content output indications, the rights management device may determine at least one of the marker ID, the content ID, the one or more content output indications timestamp, and the media device ID.

The policy module 130 may be configured to store one or more content policies. The one or more content policies may comprise, for example, a content blackout policy. The one or more content policies may be configured to indicate one or more user devices authorized to output the content. For example, the one or more content policies may comprise geographic content output data, subscription output data, timing output data, blackout data, combinations thereof, and the like. For example, the one or more policies may indicate that the content should not be output to any user devices in a geographic area. The policy module 130 may determine a violation of the one or more content policies. For example, the policy module 130 may receive a content output indication indicating a user device has output the content. The policy module 130 may determine one or more of the location information in the content output indication, the user device identifier in the content output indication, or other information in the content output indication. The policy module 130 may compare, for example, the location information and the user device identifier to an blackout policy. The blackout policy may indicate that no user devices in a geographic region are authorized to output the content. The location information in the content output indication may indicate the user device is located in the geographic region in which no user devices are authorized to output the content. As such, the policy module 130 may determine a violation of the policy (e.g., a network error).

The location module 132 may be configured to process the location data in the content output indication. The location module 132 may be configured to determine whether the location information in the content output indication complies with an blackout policy stored in the policy module 130. For example, the location module 132 may determine the location information in the content output indication indicates a first geographic region. The location module may query the policy module 136 to determine whether the first geographic region is listed on the content blackout policy. If so, the location module 132 may determine a violation of the blackout policy (e.g., a network error).

The timing module 134 may be configured to process the timing information in the content output indication. For example, the timing module 134 may determine whether or not the timing data in the content output indication indicates that the content was output by the user device during a prohibited window. For example, the timing module 134 may query the policy module to determine a timing parameter associated with the blackout policy. The timing module 134 may compare the timing information in the content output indication with the timing parameter associated with the blackout policy to determine if a violation of the blackout policy has occurred.

The alternative content module 136 may be configured to receive, send, store, generate, determine, or otherwise process alternative content data. For example, the alternative content module 136 may be configured to request alternative content from an alternative content source. Alternative content may comprise, for example, a blank screen (e.g., black, white, any other color or absence of color), one or more advertisements, one or more messages (e.g., error messages), slate content, combinations thereof, and the like. The alternative content module 136 may be configured to cause the one or more user devices to receive alternative content. For example, the alternative content module 136 may request alternative content be sent to the one or more user devices that is in violation of the blackout policy.

The rights management device 106 may be configured to cause the media device 120 to terminate output of the content. For example, the rights management device may send a termination message to the media device 120 wherein the termination message is configured to cause the media device 120 to cease outputting (or causing output of) the content. Similarly, the rights management device 106 may send a message to a termination device (discussed further in FIG. 2 below) wherein the message causes the enforcement device to send the termination message.

Returning to the components of system 100, the network 116 may comprise a network component 129. The network component 129 may be any device, module, combinations thereof, and the like communicatively coupled to the network 116. The network component 129 may also be a router, a switch, a splitter, a packager, a gateway, an encoder, a storage device, a multiplexer, a network access location (e.g., tap), physical link, combinations thereof, and the like.

The media device 120 may comprise a demodulator, decoder, frequency tuner, combinations thereof, and the like. The media device 120 may be directly connected to the network (e.g., for communications via in-band and/or out-of-band signals of a content delivery network) and/or connected to the network 116 via a communication terminal 122 (e.g., for communications via a packet switched network). The media device 120 may implement one or more applications, such as content viewers, social media applications, news applications, gaming applications, content stores, electronic program guides, combinations thereof, and the like. Those skilled in the art will appreciate that the signal may be demodulated and/or decoded in a variety of equipment, including the communication terminal 122, a computer, a TV, a monitor, or a satellite dish. The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), combinations thereof, and the like. The communication terminal 122 may be configured for communication with the network 116 via a variety of protocols, such as IP, transmission control protocol, file transfer protocol, session initiation protocol, voice over IP (e.g., VoIP), combinations thereof, and the like. The communication terminal 122, for a cable network, may be configured to facilitate network access via a variety of communication protocols and standards, such as Data Over Cable Service Interface Specification (DOCSIS).

A first access point 123 (e.g., a wireless access point) may be located at the user location 119. The first access point 123 may be configured to provide one or more wireless networks in at least a portion of the user location 119. The first access point 123 may be configured to facilitate access to the network 116 to devices configured with a compatible wireless radio, such as a mobile device 124, the media device 120, the display device 121, or other computing devices (e.g., laptops, sensor devices, security devices). The first access point 123 may be associated with a user managed network (e.g., local area network), a service provider managed network (e.g., public network for users of the service provider), combinations thereof, and the like. It should be noted that in some configurations, some or all of the first access point 123, the communication terminal 122, the media device 120, and the display device 121 may be implemented as a single device.

The user location 119 is not necessarily fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, combinations thereof, and the like. The mobile device 124 may communicate with a variety of access points (e.g., at different times and locations or simultaneously if within range of multiple access points), such as the first access point 123 or the second access point 125.

Figure 2:
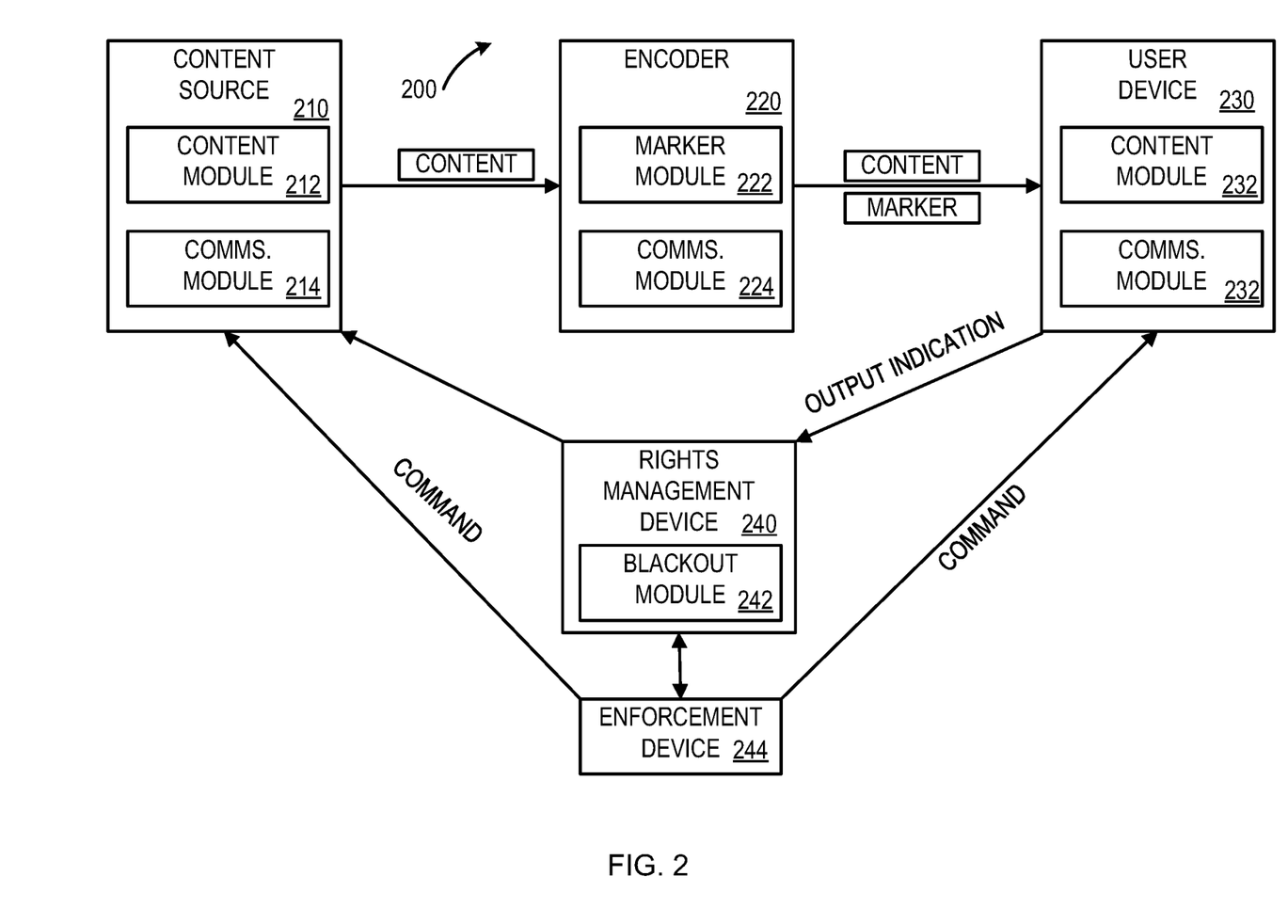
FIG. 2 show an example system for content management.

FIG. 2 shows an example system 200. The system 200 may comprise a content source 210 (e.g., the content source 102), an encoder 220 (e.g., the encoder 104), a user device 230 (e.g., the media device 120), a rights management device 240 (e.g., the rights management device 106), and an enforcement device 244. The content source 210 may send content to the encoder 220. The encoder 220 may receive the content and insert, into the content, one or more markers. The one or more markers may comprise one or more beacons configured to cause the user device 230 to send, to the rights management device 240, one or more content output indications.

The content source 210 may comprise a content module 212 and a communications module 214. The communications module 214 may be configured to receive, send, store, generate, or otherwise process data. The content module 212 may be configured to receive, send, store, generate, or otherwise process content. For example, the content source 210 may be configured to send content stored in the content module 212. The content module 212 may receive live content (e.g., from a content feed (not pictured)). For example, the content feed may be a camera configured to capture image data and generate a camera feed. The content source 210 may be a computing device configured to receive the camera feed and process it for distribution. For example, the content source 210 may send the content to the encoder 220.

The encoder 220 may receive the content. The encoder may comprise a marker module 222 and a communications module 224. The communications module 224 may be configured to receive, send, store, generate, or otherwise process data. The marker module 222 may be configured to insert, into the content, one or more markers. The one or more markers may comprise, for example, one or more SCTE-35 markers and/or one or more SCTE-224 markers. The encoder 220 may send the content and the one or more markers to the user device 230. The one or more markers may comprise one or more beacons.

The user device 230 may receive the content and the one or more markers. The user device 230 may comprise a content module 232 and a communication module 234. The communications module may be configured to receive, send, store, generate, or otherwise process data. The content module 232 may be configured to receive, send, store, generate, or otherwise process content. The content module 232 may be configured to output the content. For example, the content module 232 may be configured to receive the content, determine the one or more markers, and send, based on the one or more beacons in the one or more markers, send via the communications module 232, one or more content output indications. The user device 230 may send the one or more content output indications to the rights management device 240.

The rights management device 240 may be configured to receive the one or more content output indications. The rights management device 240 may comprise a policy module 242. The policy module 242 may be configured to store one or more content policies (e.g., one or more blackout policies, one or more blackout policies, one or more subscription policies, one or more gaming policies, combinations thereof, and the like). The blackout module 242 may be configured receive the one or more content output indications and determine whether or not the user device 230 is in compliance with the one or more policies. For example, the blackout module 242 may be configured to parse the one or more content output indications and determine one or more of the location information, the timing data, and/or the user device identifier in the one or more content output indications. The blackout module 242 may be configured to compare the location information, the timing data, and/or the user device identifier to an embargo policy stored in the blackout module 242 to determine whether or not the user device 230 is authorized to output the content (e.g., and thereby determine a network error). If the rights management device 240 determines a violation of the blackout policy, the rights management device 240 may send a policy violation message to the enforcement device 244. Based on receive the policy violation message, the enforcement device 244 may send a command to the user device 230. The command may be configured to cause the user device 230 to cease outputting the content. The command may be configured to cause the user device 230 to output an error message. The command may be configured to cause the user device 230 to output alternative content. The rights management device 240 may send a message a message to the content source 210 to send the alternative content to the user device 230.

Figure 3:
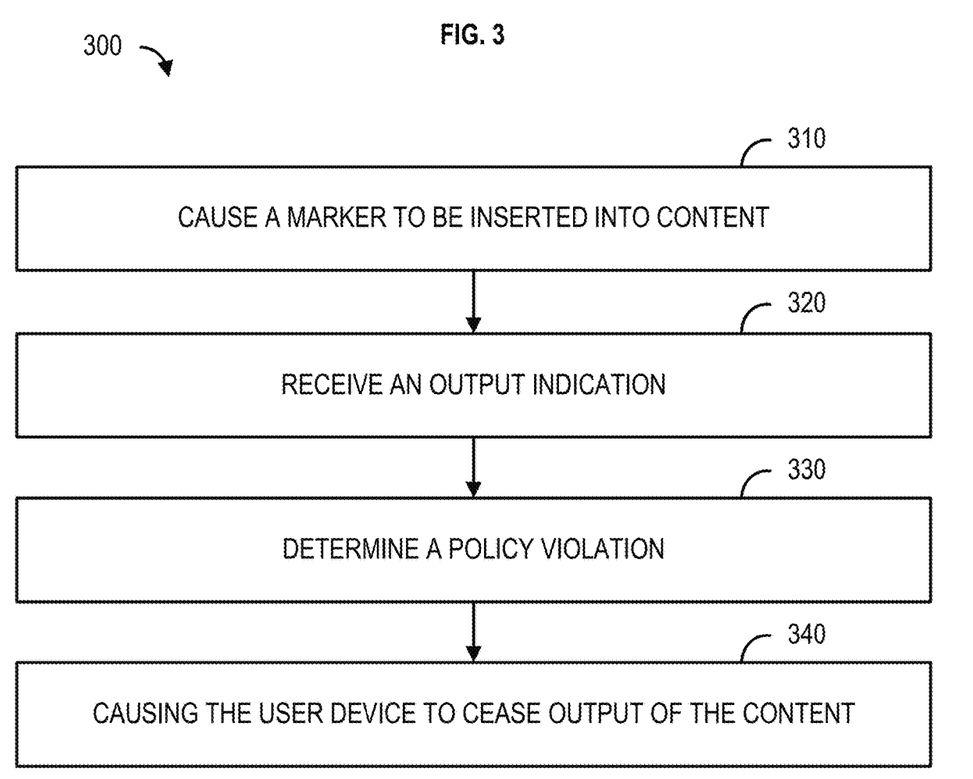
FIG. 3 shows an example method.

FIG. 3 shows a flowchart of a method 300 for content management. The method 300 may be carried out on any one or more of the devices described in FIGS. 1A-1B, FIG. 2, and/or FIG. 6. At step 310, content comprising a marker may be determined. For example, the marker may be caused to be inserted into content. For example, an encoding device may insert the marker in to the content. The marker may comprise one or more SCTE-35 markers, one or more SCTE-224 markers, combinations thereof, and the like. The marker may comprise a beacon. The beacon may be configured to cause a receiving device (e.g., a user device) to take an action such as to send a content output indication, send a query, send a request, combinations thereof, and the like.

At step 320, a content output indication may be received. The content output indication may indicate the user device received and output the content. The content output indication may comprise one or more content identifiers configured to indicate one or more of: a channel, a title, a content source identifier, a user device identifier, a geographic location, or timing data. The output indication may comprise a marker ID and/or timestamp associated with the marker. The user device may send the content output indication based on the marker. For example, the beacon may be configured to cause the user device to send, based on receiving the beacon, one or more content output indications. The content output indication may comprise a user device identifier associated with the user device. The device identifier may comprise, for example, a unique string or characters, letters, numbers, symbols, etc. For example, the device identifier may comprise an OUI, a MAC address, an IP address, model number, a brand name, or any other identifier. The content output indication may comprise timing data, location data, or any other data. For example, the timing data may indicate a time at which the user device output the content. For example, the location data may indicate a location associated with the user device (e.g., a geographic location, a syscode, combinations thereof, or the like.

At 330, it may determined that the user device is not authorized to output the content. For example, the determination that the user device is not authorized to output the content may be based on a policy violation (e.g., a violation of one or more rules). The policy violation may be determined based on the output indication from the user device. The policy violation may be associated with one or more policies. The one or more policies may comprise one or more of: a content blackout policy, an advertising policy, an age restriction policy, a supplemental feature policy, or a video quality policy. The policy violation may be associated with the user device. The policy violation may indicate a network error. For example, the content may have been sent to the user device in error. For example, an EPG comprising the content and the ability to access the content may have been sent to the user device in error. For example, determining that the network error may comprise determining a blackout policy listing the user device identifier associated with the user device as an embargoed device (e.g., a device that should not receive the content).

At 340, the user device may be caused to cease output of the content. For example, an enforcement device may cause the user device to cease output of the content. The enforcement device may receive a message from the rights management device indicating the user device has violated a policy of one or more policies. The message may comprise an identifier associated with the user device. The enforcement device may receive the message and send, to the user device, based on the identifier associated with the user device, a termination message configured to cause the user device to cease output of the content.

The method may further comprise sending, based on the network error, an error message. The method may comprise sending, based on the network error, alternative content to the user device. The method may comprise causing the user device to output the alternative content. The method may comprise sending, based on the network error, a termination message to the user device. The termination message may be configured to cause the user device to cease outputting the content.

Figure 4:
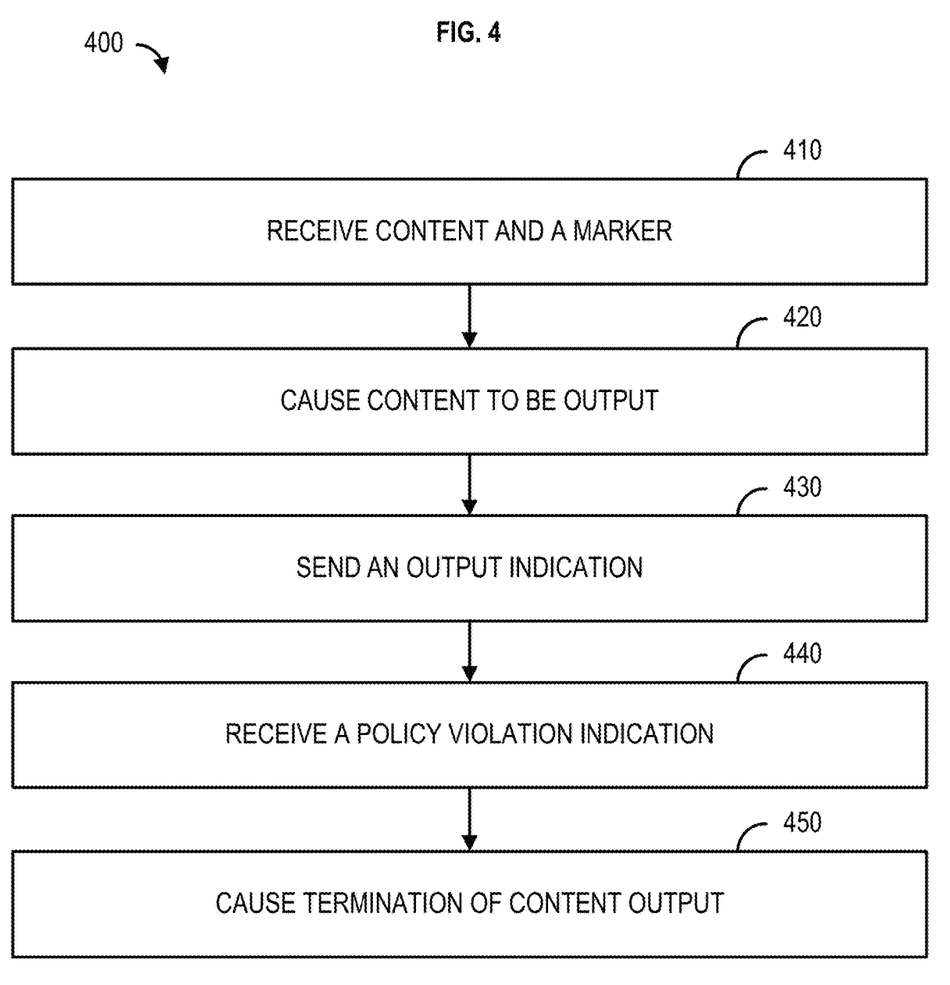
FIG. 4 shows an example method.

FIG. 4 shows a flowchart of a method 400 for content management. The method 400 may be carried out on any one or more of the devices described in FIGS. 1A-1B, FIG. 2, and/or FIG. 6. At 410, content comprising a maker may be determined. For example, a user device may receive content and a marker. The user device may comprise a set-top-box, a mobile device (e.g., a smart phone), a computer, combinations thereof, or the like. The content may comprise audio content, video content, combinations thereof, or the like. The content may comprise streaming content. The content may comprise one or more content segments. The content may comprise one or more markers. For example, the one or more markers may comprise one or more SCTE-35 markers and/or one or more SCTE-224 markers or the like. The one or more markers may comprise one or more beacons. The one or more beacons may configured to cause a receiving device (e.g., a user device) to take an action such as to send a content output indication, send a query, make a request, combinations thereof, and the like.

At 420, the content may be caused to be output. For example, the user device may be caused to output the content. Outputting the content may comprise causing the user device and/or a display device associated with the user device to display or otherwise output the content.

At 430, a content output indication may be sent. For example, the user device may send, to a computing device, the content output indication. The content output indication may indicate the user device received and output the content. The content output indication may comprise one or more content identifiers configured to indicate one or more of: a channel, a title, a content source identifier, a user device identifier, a geographic location, or timing data. The user device may send the content output indication based on the beacon. For example, the beacon may be configured to cause the user device to send, based on receiving the beacon, one or more content output indications. The content output indication may comprise a user device identifier associated with the user device. The device identifier may comprise, for example, a unique string or characters, letters, numbers, symbols, etc. For example, the device identifier may comprise an OUI, a MAC address, an IP address, model number, a brand name, or any other identifier. The content output indication may comprise timing data, location data, or any other data. For example, the timing data may indicate a time at which the user device output the content. For example, the location data may indicate a location associated with the user device (e.g., a geographic location, a syscode, combinations thereof, or the like).

At 440, one or more rule violations may be determined. The one or more rules violations may be based on one or more policies as described herein. The one or more rules violations may be determined by comparing a device identifier associated with the user device (e.g., in the content output indication) the user device may receive a blackout policy violation indication. The blackout policy violation indication may be sent by a computing device (e.g., the encoder, rights management device, the content source, etc.). The blackout policy violation indication may indicate that the user device output the content in error (e.g., in violation of a blackout policy). For example, the blackout policy violation indication may indicate the user device is not authorized to access and/or output the content.

At 450, the user device may terminate outputting the content. The user device may terminate outputting the content based on the blackout policy violation indication. For example, the blackout policy violation indication may be configured to cause the user device to terminate outputting the content. The blackout policy violation indication may be configured to cause the user device to display an error message.

The method may comprise requesting, based on the error indication, alternative content. The method may comprise outputting, based on the error indication, alternative content. The method may comprise displaying a selectable option. The method may comprise receiving, via the selectable option, a user input.

Figure 5:
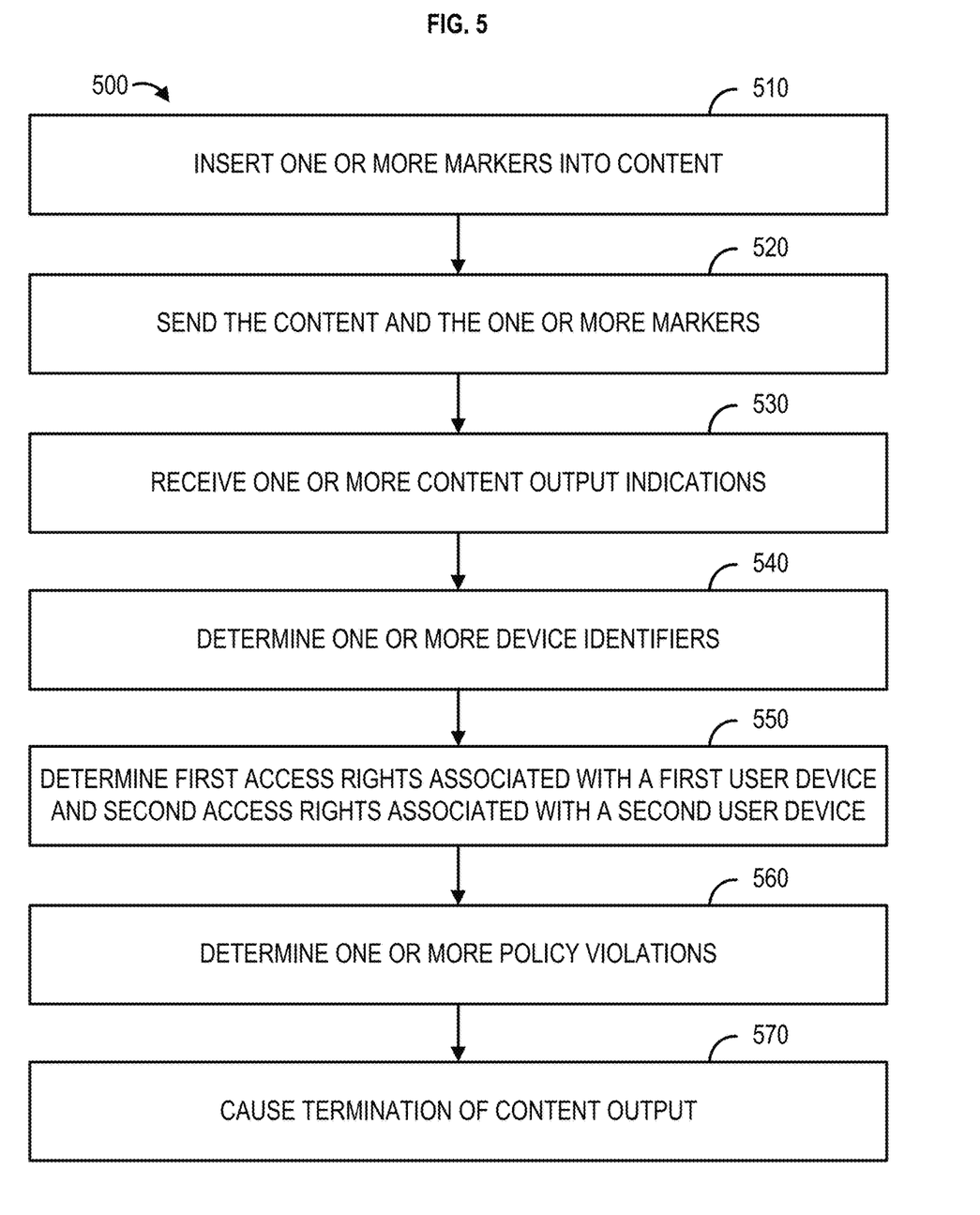
FIG. 5 shows an example method.

FIG. 5 shows an example method 500. The method 500 may be carried out on any one or more of the devices described in FIGS. 1A-1B, FIG. 2, and/or FIG. 6. At step 510, one or more markers may be caused to be inserted into content. For example, an encoding device may insert the one or more markers into the content. The one or more markers may comprise one or more SCTE-35 markers, one or more SCTE-224 markers, combinations thereof, and the like. The marker may comprise one or more beacons.

At 520, content and the one or more markers may be sent. For example, the encoder may send, to one or more user devices, content and the one or more markers. The one or more markers may comprise one or more beacons. The one or more beacons may be configured to cause one or more receiving devices (e.g., a user device) to take an action such as to send a content output indication, send a query, make a request, combinations thereof, and the like. For example, the one or more content output indications may indicate the one or more user devices have output the content. The one or more user devices may comprise one or more set-top-boxes (STBs), one or more mobile devices, one or more computers, combinations thereof, and the like.

At 530, one or more content output indications may be received. For example, the one or more content output indications may be received by a computing device. For example, the computing device may comprise the encoder, the rights management device, the content source, or any other device. The one or more content output indications may comprise one or more user device identifiers. The one or more user device identifiers may be associated with the one or more user devices. The one or more user device identifiers may comprise one or more unique identifiers associated with the one or more user devices. For example, a first user device identifier may be associated with a first user device and a second user device identifier may be associated with a second user device. The one or more user device identifiers may comprise, for example, an organizational unique identifier (OUI), a media access control (MAC) address, a model number, a brand identifier, a user identifier, a location identifier (e.g., a syscode or the like).

At 540, the computing device may determine the one or more device identifiers associated with the one or more user device identifiers may comprise de-encrypting the one or more content output indications or otherwise determining the one or more user device identifiers. Determining the one or more device identifiers may comprise determining location data (e.g., one or more locations) associated with the one or more user device identifiers.

At 550, one or more access rights may be determined. The one or more access rights may indicate whether or not a given user device of the one or more user devices is authorized to output the content. For example, the computing device may determine first access rights associated with a first user device of the one or more user devices and second access rights associated with a second user device of the one or more user devices. Determining the one or more access rights may comprise querying a database. The database may store any data related to content, for example, the database may store a content blackout policy. For example, the database may comprise a content schedule (e.g., a broadcast schedule). The content schedule may comprise location data, subscription data, one or more blackout schedules, combinations thereof, and the like. For example, the first access rights may indicate the first user device is authorized to access and/or output the content. For example, the second access rights may indicate the second user device is not authorized to access and/or output the content. For example, the second user device may be associated with a user device identifier listed on a content blackout policy.

At 560, one or more policy violations may be determined. For example, it may be determined that a second user device of the one or more user devices is not authorized to output the content. For example, the computing device may determine one or more policy violations based on the second access rights associated with the second user device of the one or more user devices.

At 570, output of the content on the second device may be caused to be terminated. For example, the computing device may cause the output of the content on the second device to be terminated. For example, a termination command may be sent to the second user device wherein the termination command is configured to cause the second user device to stop outputting the content.

The method may further comprise determining, based on the one or more device identifiers, a user account associated with the first user device and the second user device; and sending, to the second user device, a selectable option. The selectable option may be configured to receive one or more user inputs. The selectable option may comprise, for example, a content purchase option, a subscription option, or the like. The method may comprise receiving, from the second user device, an option selection indication configured to output, on the second user device, the content. The method may comprise causing output of alternative content on the second user device. The alternative content may comprise, for example, an advertisement.

Figure 6:
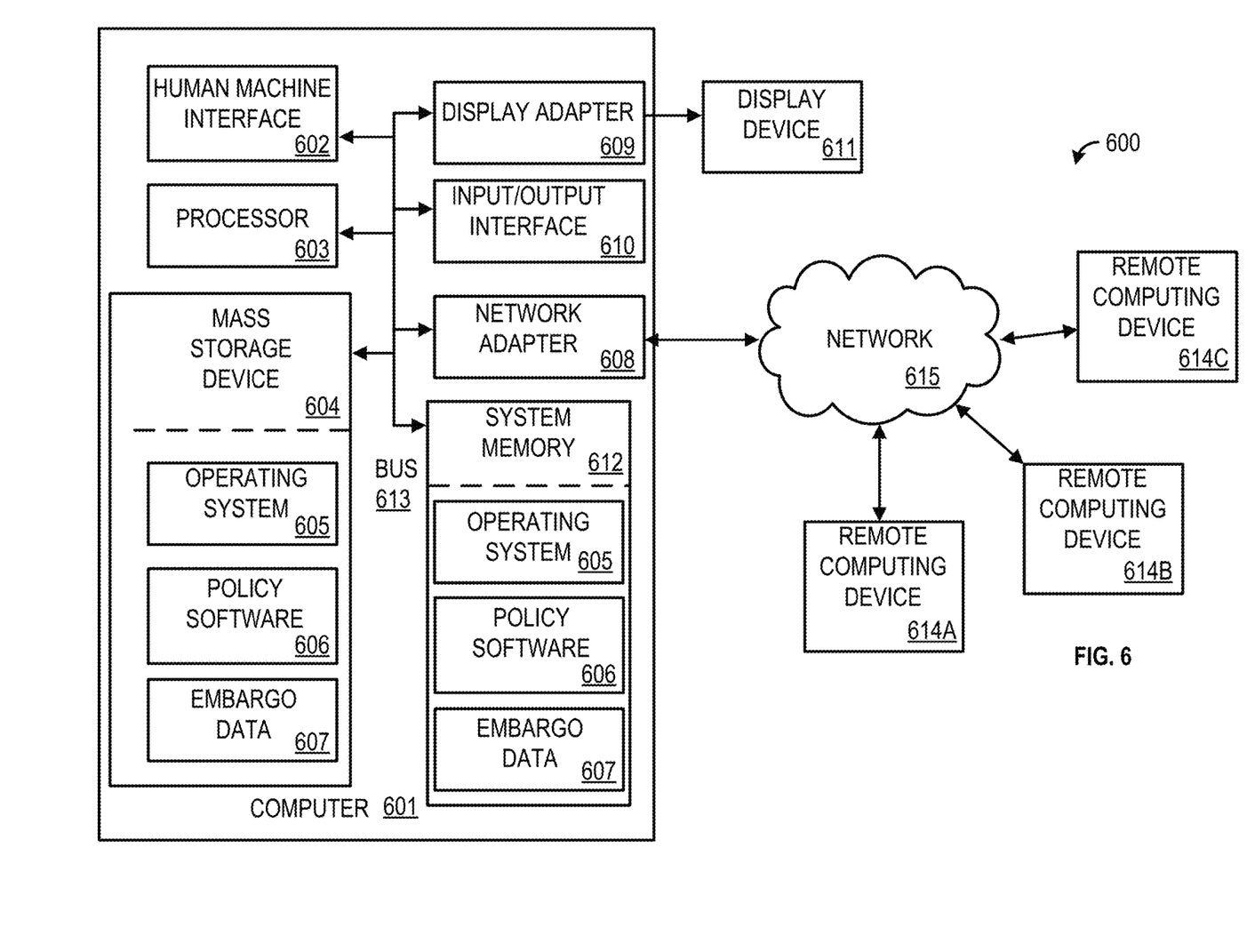
FIG. 6 shows an example system.

FIG. 6 shows a system 600 for content management. The media device 120, the display device 121, the communication terminal 122, the mobile device 124, the rights management device 106, the content source 102, the encoder 104, and/or the network component 129 of FIG. 1 may be a computer 601 as shown in FIG. 6. The user device 202, the network device 204, the content device 206, and/or the computing device 208 of FIG. 2 may be a computer 801 as shown in FIG. 6. The computer 601 may comprise one or more processors 703, a system memory 612, and a bus 613 that couples various system components including the one or more processors 603 to the system memory 612. In the case of multiple processors 603, the computer 601 may utilize parallel computing. The bus 613 is one or more of several possible types of bus structures, including a memory bus or memory controller, a peripheral bus, an accelerated graphics port, or local bus using any of a variety of bus architectures.

The computer 601 may operate on and/or comprise a variety of computer readable media (e.g., non-transitory). The readable media may be any available media that is accessible by the computer 601 and may comprise both volatile and non-volatile media, removable and non-removable media. The system memory 612 has computer readable media in the form of volatile memory, such as random access memory (RAM), and/or non-volatile memory, such as read only memory (ROM). The system memory 612 may store data such as the policy data 607 and/or program modules such as the operating system 605 and the policy software 606 that are accessible to and/or are operated on by the one or more processors 603. The machine learning module may comprise one or more of the policy data 607 and/or the policy software 606.

The computer 601 may also comprise other removable/non-removable, volatile/non-volatile computer storage media. FIG. 6 shows the mass storage device 604 which may facilitate non-volatile storage of computer code, computer readable instructions, data structures, program modules, and other data for the computer 601. The mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any quantity of program modules may be stored on the mass storage device 604, such as the operating system 605 and the policy software 606. Each of the operating system 605 and the policy software 606 (or some combination thereof) may comprise elements of the program modules and the policy software 606. The policy data 607 may also be stored on the mass storage device 604. The policy data 607 may be stored in any of one or more databases known in the art. Such databases may be DB2®, Microsoft® Access, Microsoft® SQL Server, Oracle®, MySQL, PostgreSQL, and the like. The databases may be centralized or distributed across locations within the network 615.

A user may enter commands and information into the computer 601 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 603 via a human machine interface 602 that is coupled to the bus 613, but may be connected by other interface and bus structures, such as a parallel port, game port, an IEEE 1394 Port (also known as a Firewire port), a serial port, network adapter 608, and/or a universal serial bus (USB).

The display device 611 may also be connected to the bus 613 via an interface, such as the display adapter 609. It is contemplated that the computer 601 may comprise more than one display adapter 609 and the computer 601 may comprise more than one display device 611. The display device 611 may be a monitor, an LCD (Liquid Crystal Display), light emitting diode (LED) display, television, smart lens, smart glass, and/or a projector. In addition to the display device 611, other output peripheral devices may be components such as speakers (not shown) and a printer (not shown) which may be connected to the computer 601 via the Input/Output Interface 610. Any step and/or result of the methods may be output (or caused to be output) in any form to an output device. Such output may be any form of visual representation, including, but not limited to, textual, graphical, animation, audio, tactile, and the like. The display device 611 and computer 601 may be part of one device, or separate devices.

The computer 601 may operate in a networked environment using logical connections to one or more remote computing devices 614A,B,C. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 601 and a remote computing device 614A,B,C may be made via a network 615, such as a local area network (LAN) and/or a general wide area network (WAN). Such network connections may be through the network adapter 608. The network adapter 608 may be implemented in both wired and wireless environments. Such networking environments are conventional and commonplace in dwellings, offices, enterprise-wide computer networks, intranets, and the Internet.

Application programs and other executable program components such as the operating system 605 are shown herein as discrete blocks, although it is recognized that such programs and components reside at various times in different storage components of the computing device 601, and are executed by the one or more processors 603 of the computer. An implementation of the predicting software 606 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the quantity or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
    determining content comprising a marker, wherein the marker causes a user device to send a content output indication associated with the content;
    receiving, based on the marker, the content output indication, wherein the content output indication indicates the content has been output on the user device;
    determining, based on one or more rules, that the user device is not authorized to output the content; and
    causing, based on determining that that the user device is not authorized to output the content, the user device to cease output of the content.

2. The method of claim 1, wherein the marker comprises one or more of: a SCTE-35 marker or a SCTE-224 marker.

3. The method of claim 1, wherein the one or more rules comprise one or more of: a content blackout policy, an advertising policy, an age restriction policy, a supplemental feature policy, or a video quality policy.

4. The method of claim 1, wherein the content output indication comprises one or more content identifiers configured to indicate one or more of: a channel, a title, a content source identifier, a user device identifier, a geographic location, or timing data.

5. The method of claim 1, where determining the user device is not authorized to output the content comprises comparing a user device identifier associated with the user device with a list of one or more user device identifiers associated with the one or more rules.

6. The method of claim 1, further comprising determining, based on the content output indication, a network error.

7. The method of claim 6, further comprising sending, based on the network error, alternative content.

8. A method comprising:
    determining content comprising a marker, wherein the marker causes a user device to send a content output indication associated with the content;
    causing the content to be output;
    based on the content being output, sending the content output indication, wherein the content output indication indicates the content has been output;
    determining, based on the content output indication, one or more rule violations; and
    causing, based on the one or more rule violations, termination of output of the content.

9. The method of claim 8, where in the marker comprises a SCTE-35 marker and wherein the user device comprises a set-top-box.

10. The method of claim 8, wherein the one or more rule violations is determined based on a user device identifier associated with the user device.

11. The method of claim 8, wherein the content output indication comprises one or more content identifiers configured to indicate one or more of: a channel, a title, a content source identifier, a user device identifier, a geographic location, or timing data.

12. The method of claim 8, further comprising requesting, based on the one or more rule violations, alternative content.

13. The method of claim 8, further comprising outputting, based on the one or more rule violations, alternative content.

14. The method of claim 8, further comprising outputting, based on the one or more rule violations, an error message.

15. A method comprising:
    inserting, into content, one or more markers that cause one or more user devices to send one or more content output indications associated with the content;
    sending, to the one or more user devices, the content and the one or more markers, wherein the content is associated with one or more policies;
    receiving, from the one or more user devices, the one or more content output indications, wherein the one or more content output indications indicate the one or more user devices have output the content;

determining, based on the one or more content output indications, one or more device identifiers associated with the one or more user devices;

determining, based on the one or more device identifiers, first access rights associated with a first user device of the one or more user devices and second access rights associated with a second user device of the one or more user devices;

determining, based on the second access rights and the one or more policies, that the second user device is not authorized to output the content; and causing, based on the second user device not being authorized to output the content, termination of output of the content on the second user device.

16. The method of claim 15, wherein the one or more markers comprise one or more SCTE-35 markers.

17. The method of claim 15, wherein the first user device comprises a set-top-box and wherein the second user device comprises a mobile device.

18. The method of claim 15, further comprising:
determining, based on the one or more device identifiers, a user account associated with the first user device and the second user device; and
sending, to the second user device, a selectable option.

19. The method of claim 18, further comprising receiving, from the second user device, an option selection indication configured to output, on the second user device, the content.

20. The method of claim 15, further comprising causing output of alternative content on the second user device.

* * * * *